United States Patent
Yoshida

(10) Patent No.: US 8,546,033 B2
(45) Date of Patent: Oct. 1, 2013

(54) FUEL CELL APPARATUS COMPRISING A HIGH POTENTIAL AVOIDANCE VOLTAGE SETTING DEVICE

(75) Inventor: Michio Yoshida, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 415 days.

(21) Appl. No.: 12/808,556

(22) PCT Filed: Dec. 11, 2008

(86) PCT No.: PCT/JP2008/072555
§ 371 (c)(1),
(2), (4) Date: Jun. 16, 2010

(87) PCT Pub. No.: WO2009/078339
PCT Pub. Date: Jun. 25, 2009

(65) Prior Publication Data
US 2011/0033762 A1  Feb. 10, 2011

(30) Foreign Application Priority Data
Dec. 19, 2007 (JP) ................................. 2007-327344

(51) Int. Cl.
*H01M 8/04* (2006.01)
*H01M 8/22* (2006.01)
(52) U.S. Cl.
USPC ......................................... 429/432; 429/502
(58) Field of Classification Search
USPC ................. 429/428, 429, 430, 431, 441, 416, 429/432, 502; 180/65.31, 104.33
See application file for complete search history.

(56) References Cited

U.S. PATENT DOCUMENTS

| | | | |
|---|---|---|---|
| 6,413,661 B1 * | 7/2002 | Clingerman et al. | 429/416 |
| 2004/0048119 A1 * | 3/2004 | Iwase | 429/22 |
| 2004/0142216 A1 * | 7/2004 | Wakabayashi et al. | 429/13 |
| 2005/0142406 A1 * | 6/2005 | Obata et al. | 429/22 |
| 2005/0244691 A1 * | 11/2005 | Varenne | 429/26 |
| 2007/0141416 A1 * | 6/2007 | Kilian et al. | 429/23 |
| 2007/0275276 A1 * | 11/2007 | Saeki et al. | 429/13 |

FOREIGN PATENT DOCUMENTS

| | | |
|---|---|---|
| CN | 1689857 A1 | 11/2005 |
| DE | 11 2008 003 145 T5 | 10/2010 |
| JP | 07-153474 A | 6/1995 |
| JP | 2003-197210 A | 7/2003 |

(Continued)

OTHER PUBLICATIONS

Machine Translation of: JP 2007/194223 A, Nishiyama, K., Aug. 2, 2007.*

*Primary Examiner* — Kenneth Douyette
(74) *Attorney, Agent, or Firm* — Kenyon & Kenyon LLP

(57) ABSTRACT

A fuel battery system which can suppress unexpected variation of a target power during execution of a high potential avoidance control operation. The fuel battery system sets a high potential avoidance target voltage value, converts the high potential avoidance target voltage value into a target power value on the basis of the voltage-power property map of a fuel battery, limits the target power value within a range between a predetermined upper limit value and a predetermined lower limit value, and controls the operation of the fuel battery on the basis of the target power value while limiting the output voltage of the fuel battery to a value which is not larger than the high potential avoidance target voltage. This can suppress the unexpected variation of the target power value resulting from the erroneous estimation of output properties caused by the momentary drop of the high potential avoidance target voltage.

6 Claims, 4 Drawing Sheets

(56) References Cited

FOREIGN PATENT DOCUMENTS

| | | |
|---|---|---|
| JP | 2004-288530 A | 10/2004 |
| JP | 2005-100820 A | 4/2005 |
| JP | 2006-033934 A | 2/2006 |
| JP | 2007-194223 A | 8/2007 |

* cited by examiner

FUEL CELL APPARATUS COMPRISING A HIGH POTENTIAL AVOIDANCE VOLTAGE SETTING DEVICE

This is a 371 national phase application of PCT/JP2008/072555 filed 11 Dec. 2008, which claims priority to Japanese Patent Application No. 2007-327344 filed 19 Dec. 2007, the contents of which are incorporated herein by reference.

TECHNICAL FIELD

The present invention relates to a fuel battery system which receives supply of a reactant gas to generate a power.

BACKGROUND ART

A fuel battery is a power generation system which oxidizes a fuel by an electrochemical process to directly convert energy discharged owing to an oxidizing reaction into electric energy. The fuel battery comprises a membrane electrode assembly in which both side surfaces of a polymer electrolyte membrane for selectively transporting hydrogen ions are held by a pair of electrodes made of a porous material. Each of the pair of electrodes contains, as a main component, carbon powder which carries a platinum based metal catalyst, and comprises a catalyst layer which comes in contact with the polymer electrolyte membrane, and a gas diffusion layer formed on the surface of the catalyst layer and having both air permeability and electron conductivity.

In this type of fuel battery, in a state where an electrode potential is kept to be high (especially during a low density current operation, an idle operation or the like), the platinum catalyst included in the catalyst layer of the membrane electrode assembly might be ionized and eluted, thereby lowering performance. There is known a method (hereinafter referred to as high potential avoidance control) in which to avoid such a disadvantage, the operation is controlled while limiting the output voltage of the fuel battery to a use upper limit voltage (hereinafter referred to as the high potential avoidance voltage) which is lower than the open end voltage of the fuel battery as disclosed in Japanese Patent Application Laid-Open No. 2005-100820.

Patent Document 1: Japanese Patent Application Laid-Open No. 2005-100820

DISCLOSURE OF THE INVENTION

Means for Solving the Problem

When the output voltage of a fuel battery is momentarily lowered by high potential avoidance control, however, a charge is discharged from the parasitic capacitance of the fuel battery owing to C-V properties (cyclic voltammogram) of the fuel battery, whereby a phenomenon might occur in which apparent I-V properties (current-voltage properties) deviate from original I-V properties. In a fuel battery system in which the output voltage and output current of the fuel battery are acquired for each predetermined calculation cycle to estimate an I-V property map and an operation is controlled on the basis of this estimated I-V property map, when the above phenomenon occurs, the operation of the battery is controlled on the basis of an erroneously estimated I-V property map. In another fuel battery system provided with a DC/DC converter for switching a single phase operation and a three-phase operation to control the output voltage of a fuel battery, when the operation is controlled on the basis of the erroneously estimated I-V property map, a power passing through the DC/DC converter exceeds a passable power during the single phase operation, and the operation of the fuel battery cannot be controlled owing to converter failure sometimes.

To solve the present invention, an object of the present invention is to provide a fuel battery system which can suppress the unexpected variation of a target power during execution of a high potential avoidance control operation.

Means for Solving the Problem

To achieve the above object, a fuel battery system according to the present invention comprises a fuel battery which receives supply of a reactant gas to generate a power; an estimation device which estimates output properties of the fuel battery; a high potential avoidance voltage setting device which sets a high potential avoidance target voltage value; a target power calculation device which converts the high potential avoidance target voltage value into a target power value on the basis of the output properties and which limits the target power value within a range between a predetermined upper limit value and a predetermined lower limit value; and a control device which controls the operation of the fuel battery on the basis of the target power value while limiting the output voltage of the fuel battery to a value which is not larger than the high potential avoidance target voltage. According to such a constitution, it is possible to suppress the unexpected variation of the target power value resulting from the erroneous estimation of the output properties caused by the momentary drop of the high potential avoidance target voltage.

The high potential avoidance voltage setting device may variably set the high potential avoidance target voltage for each predetermined calculation cycle. According to such a constitution, an optimum high potential avoidance target voltage can be set in accordance with the charge state of an accumulator which accumulates the power generated by the fuel battery, a vehicle running mode or the like.

The estimation device may update the output properties for each predetermined calculation cycle. The output properties of the fuel battery vary in accordance with an operation state every second, whereby the output properties are preferably successively updated.

The fuel battery system according to the present invention may further comprise a voltage control device which controls the output voltage of the fuel battery. Here, the above upper limit value and lower limit value are preferably set on the basis of the upper limit value and lower limit value of a passing power which passes through the voltage control device. In consequence, it is possible to avoid a disadvantage that the target power value is above the upper limit value or below the lower limit value of the passing power which passes through the voltage control device. Moreover, examples of the voltage control device preferably include a DC/DC converter which switches a single phase operation and a three-phase operation in accordance with the passing power.

Effect of the Invention

According to the present invention, it is possible to suppress the unexpected variation of a target power during execution of a high potential avoidance control operation.

DESCRIPTION OF REFERENCE NUMERALS

10 . . . fuel battery system, 20 . . . fuel battery stack, 30 . . . oxidizing gas supply system, 40 . . . fuel gas supply system, 50 . . . power system, and 60 . . . controller.

BEST MODE FOR CARRYING OUT THE INVENTION

Hereinafter, an embodiment according to the present invention will be described with reference to drawings.

Figure 1:
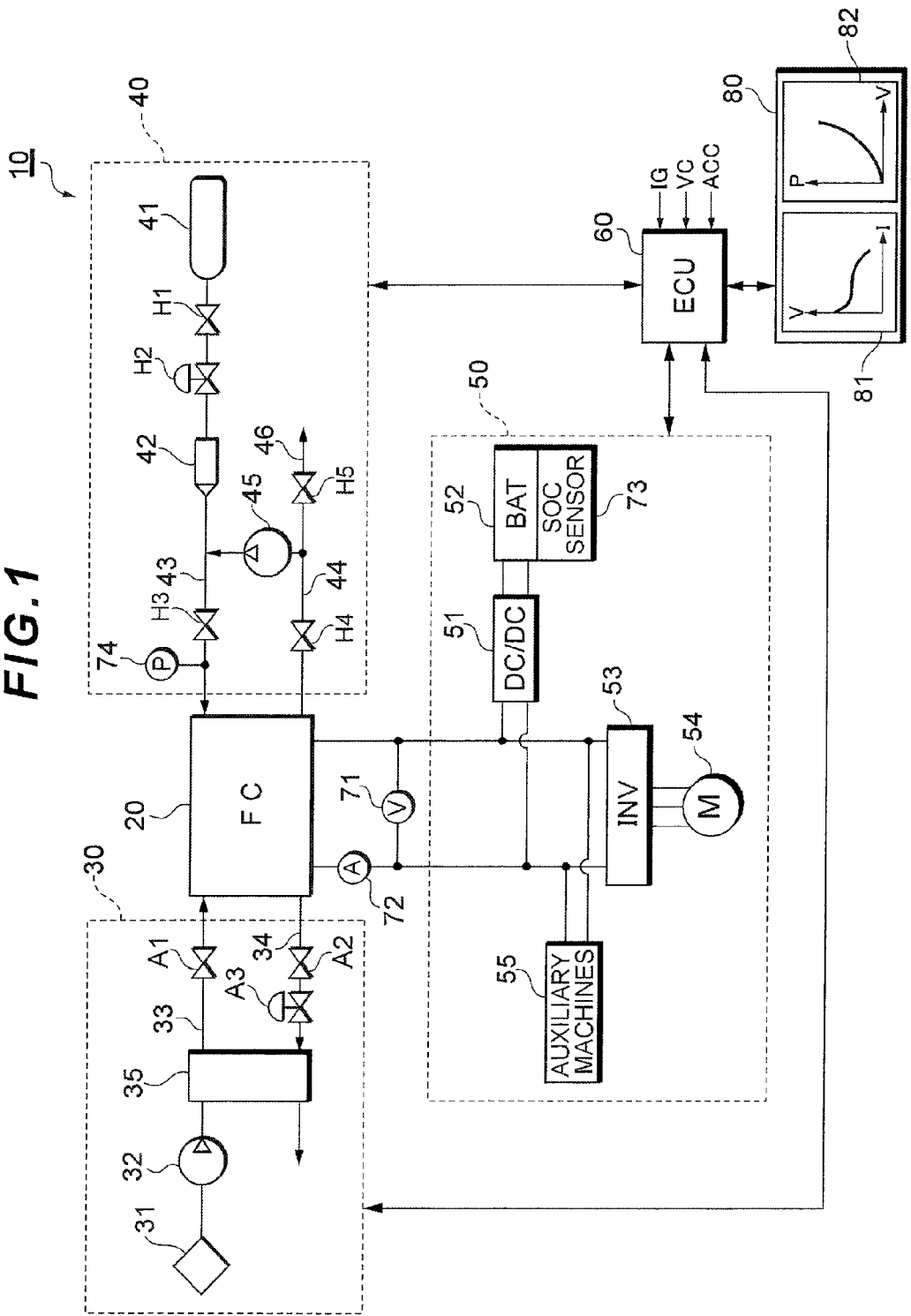
FIG. 1 is a system constitution diagram of a fuel battery system according to the present embodiment.

FIG. 1 shows a system constitution of a fuel battery system 10 which functions as a car-mounted power source system of a fuel battery vehicle.

The fuel battery system 10 functions as the car-mounted power source system mounted in the fuel battery vehicle, and comprises a fuel battery stack 20 which receives supply of a reactant gas (a fuel gas, an oxidizing gas) to generate a power; an oxidizing gas supply system 30 which supplies air as the oxidizing gas to the fuel battery stack 20; a fuel gas supply system 40 which supplies a hydrogen gas as the fuel gas to the fuel battery stack 20; a power system 50 which controls charging/discharging of the power; and a controller 60 which generally controls the whole system.

The fuel battery stack 20 is a solid polymer electrolyte type cell stack in which a large number of cells are stacked in series. In the fuel battery stack 20, an oxidizing reaction of formula (1) occurs in an anode, and a reducing reaction of formula (2) occurs in a cathode. An electromotive reaction of formula (3) occurs in the whole fuel battery stack 20.

$$H_2 \rightarrow 2H^+ + 2e^- \quad (1)$$

$$(\tfrac{1}{2})O_2 + 2H^+ + 2e^- \rightarrow H_2O \quad (2)$$

$$H_2 + (\tfrac{1}{2})O_2 \rightarrow H_2O \quad (3)$$

A voltage sensor 71 for detecting the output voltage of the fuel battery stack 20 and a current sensor 72 for detecting an output current are attached to the fuel battery stack 20.

The oxidizing gas supply system 30 comprises an oxidizing gas flow path 33 through which the oxidizing gas to be supplied to the cathode of the fuel battery stack 20 flows and an oxidizing off-gas flow path 34 through which an oxidizing off-gas discharged from the fuel battery stack 20 flows. The oxidizing gas flow path 33 is provided with an air compressor 32 which takes in the oxidizing gas from the atmosphere via a filter 31; a humidifier 35 which humidifies the oxidizing gas pressurized by the air compressor 32; and a shutoff valve A1 which shuts off the supply of the oxidizing gas to the fuel battery stack 20. The oxidizing off-gas flow path 34 is provided with a shutoff valve A2 which shuts off the discharge of the oxidizing off-gas from the fuel battery stack 20; a back-pressure regulator A3 which regulates the supply pressure of the oxidizing gas; and the humidifier 15 which exchanges water between the oxidizing gas (dry gas) and the oxidizing off-gas (wet gas).

The fuel gas supply system 40 comprises a fuel gas supply source 41; a fuel gas flow path 43 through which the fuel gas to be supplied from the fuel gas supply source 41 to the anode of the fuel battery stack 20 flows; a circulation flow path 44 which returns a fuel off-gas discharged from the fuel battery stack 20 to the fuel gas flow path 43; a circulation pump 45 which supplies under pressure the fuel off-gas from the circulation flow path 44 to the fuel gas flow path 43; and a gas/water discharge flow path 46 branched and connected to the circulation flow path 44.

The fuel gas supply source 41 is constituted of, for example, a high pressure hydrogen tank, a hydrogen storing alloy or the like, and stores the hydrogen gas having a high pressure (e.g., from 35 MPa to 70 MPa). When a shutoff valve H1 is opened, the fuel gas flows out of the fuel gas supply source 41 to the fuel gas flow path 43. The pressure of the fuel gas is decreased to, for example, about 200 kPa by a regulator H2 or an injector 42, and the gas is supplied to the fuel battery stack 20.

It is to be noted that the fuel gas supply source 41 may be constituted of a reformer which forms a hydrogen-rich reforming gas from a hydrocarbon based fuel, and a high pressure gas tank which brings the reforming gas formed by the reformer into a high pressure state to store the pressure.

The fuel gas flow path 43 is provided with the shutoff valve H1 which shuts off or allows the supply of the fuel gas from the fuel gas supply source 41; the regulator H2 which regulates the pressure of the fuel gas; the injector 42 which controls the amount of the fuel gas to be supplied to the fuel battery stack 20; a shutoff valve H3 which shuts off the supply of the fuel gas to the fuel battery stack 20; and a pressure sensor 74.

The circulation flow path 44 is connected to a shutoff valve H4 which shuts off the discharge of the fuel off-gas from the fuel battery stack 20 and the gas/water discharge flow path 46 branched from the circulation flow path 44. The gas/water discharge flow path 46 is provided with a gas/water discharge valve H5. The gas/water discharge valve H5 operates by a command from the controller 60 to discharge the fuel off-gas including impurities and the water to the outside of the circulation flow path 44. When the gas/water discharge valve H5 is opened, the concentration of the impurities of the fuel off-gas in the circulation flow path 44 decreases, and the concentration of hydrogen in the fuel off-gas circulated through a circulation system can be increased.

The fuel off-gas discharged via the gas/water discharge valve H5 is mixed with the oxidizing off-gas flowing through the oxidizing off-gas flow path 34, and is diluted by a diluter (not shown). The circulation pump 45 is driven by a motor to circulate and supply the fuel off-gas in the circulation system to the fuel battery stack 20.

The power system 50 comprises a DC/DC converter 51, a battery 52, a traction inverter 53, a traction motor 54 and auxiliary machines 55. The fuel battery system 10 has a constitution of a parallel hybrid system in which the DC/DC converter 51 and the traction inverter 53 are connected in parallel with the fuel battery stack 20. The DC/DC converter 51 has a function of raising a direct-current voltage supplied from the battery 52 to output the voltage to the traction inverter 53, and a function of lowering the pressure of a direct-current power generated by the fuel battery stack 20 or a regenerative power collected by the traction motor 54 by regenerative braking to charge the power into the battery 52. By these functions of the DC/DC converter 51, the charging/discharging of the battery 52 is controlled. Moreover, by the voltage conversion control of the DC/DC converter 51, the operation point (the output voltage, the output current) of the fuel battery stack 20 is controlled.

The DC/DC converter 51 has a circuit constitution of a multiphase converter (e.g., a three-phase full bridge converter) as a combination of a circuit which is similar to an inverter for converting an input voltage (the direct-current voltage) into an alternate-current voltage and a circuit which rectifies the alternate current to convert the current into an output voltage (the direct-current voltage). The DC/DC converter 51 is driven and controlled by switching a single phase operation and a three-phase operation in accordance with a passing power. When the passing power of the DC/DC converter 51 is less than a predetermined value, a switching loss is less in the single phase operation rather than in the three-phase operation, whereby the single phase operation is performed. On the other hand, when the passing power of the DC/DC converter 51 is not less than the predetermined value, the switching loss is less in the three-phase operation rather than in the single phase operation, whereby the three-phase operation is performed.

The battery 52 functions as a storage source of a surplus power, a regenerative energy storage source during the regenerative braking, or an energy buffer during load fluctuation accompanying the acceleration or deceleration of the fuel battery vehicle. As the battery 52, for example, a nickel/cadmium accumulator battery, a nickel/hydrogen accumulator battery, or a secondary battery such as lithium secondary battery is suitable. An SOC sensor for detecting a state of charge (SOC) is attached to the battery 52.

The traction inverter 53 is, for example, a PWM inverter driven by, for example, a pulse width modulation system, and converts a direct-current voltage output from the fuel battery stack 20 or the battery 52 into a three-phase alternate-current voltage in accordance with the control command from the controller 60 to control the rotation torque of the traction motor 54. The traction motor 54 is, for example, a three-phase alternate-current motor, and constitutes a power source of the fuel battery vehicle.

The auxiliary machines 55 generically include motors arranged in units of the fuel battery system 10 (e.g., power sources for pumps, etc.), inverters for driving these motors, and various car-mounted auxiliary machines (e.g., the air compressor, the injector, a cooling water circulation pump, a radiator, etc.).

The controller 60 is a computer system including a CPU, an ROM, an RAM and an input/output interface, and controls the units of the fuel battery system 10. For example, the controller 60 starts the operation of the battery upon receiving a start signal IG output from an ignition switch, and acquires the output voltage and output current of the fuel battery stack 20 from the voltage sensor 71 and the current sensor 72 for each predetermined calculation cycle, to successively update an I-V property map 81 of the fuel battery stack 20. For example, the controller 60 assumes that the voltage of the fuel battery stack 20 can be represented as a function (a direct function or a predetermined multiple function) of the current, and can prepare the I-V property map 81 by an estimation method using a minimum square process. The controller 60 successively updates a V-P property (voltage-power property) map 82 on the basis of the I-V property map 81. Here, it is known that the V-P property map 82 is uniquely determined on the basis of the I-V property map 81. In the present description, one or both of the I-V property map 81 and the V-P property map 82 is generically referred to as the output properties of the fuel battery stack 20. It is to be noted that the I-V property map 81 and the V-P property map 82 are stored in a memory 80.

The controller 60 calculates a vehicle running power or auxiliary machine power consumption based on an accelerator pedal open degree signal ACC output from an accelerator pedal sensor, a vehicle speed signal VC output from a vehicle speed sensor or the like. Moreover, the controller 60 calculates, as a power generation command value for the fuel battery stack 20, a larger value of a power generation command value calculated from a total value of the vehicle running power and the auxiliary machine power consumption and a power generation command value calculated from a high potential avoidance voltage, to control the power generation.

Here, auxiliary machine power includes power consumed by car-mounted auxiliary machines (the humidifier, air compressor, hydrogen pump, cooling water circulation pump, etc.), power consumed by devices necessary for the vehicle running (a transmission, wheel control device, steering device, suspension device, etc.), power consumed by devices arranged in a passenger space (an air conditioner, light fixture, audio, etc.) and the like.

Moreover, the controller 60 determines the distribution of the output power of the fuel battery stack 20 and the battery 52 on the basis of the I-V property map 81 and the V-P property map 82, and controls the oxidizing gas supply system 30 and the fuel gas supply system 40 so that the amount of the power to be generated by the fuel battery stack 20 matches a target power. Moreover, the controller controls the DC/DC converter 51 to regulate the output voltage of the fuel battery stack 20, thereby controlling the operation point of the fuel battery stack 20 (the output voltage, the output current). Furthermore, the controller 60 outputs, for example, alternate-current voltage command values of U, V and W-phases as switching commands to the traction inverter 53 so as to obtain a target torque in accordance with the accelerator pedal open degree, thereby controlling the output torque and rotation number of the traction motor 54.

Figure 2:
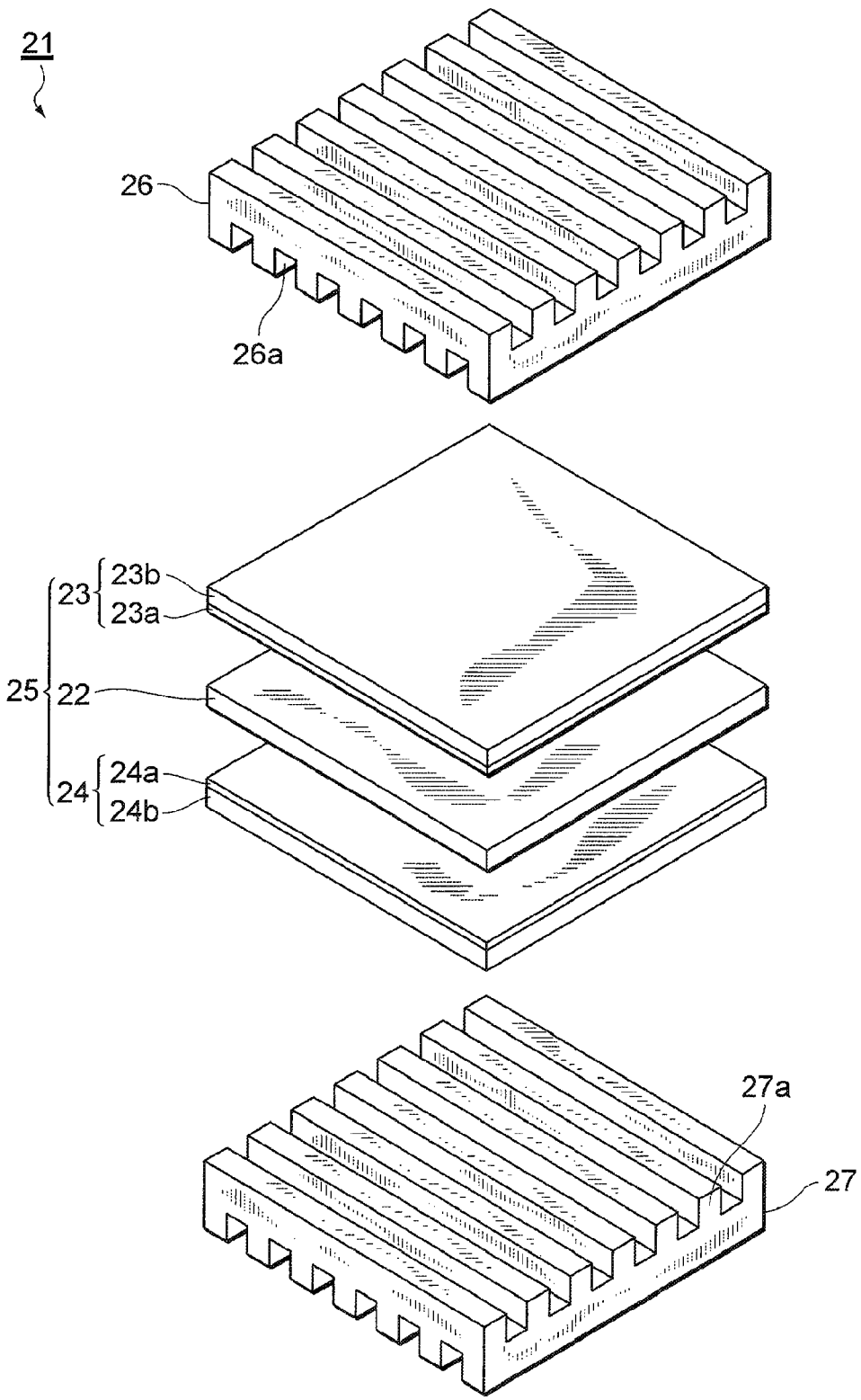
FIG. 2 is an exploded perspective view of cells according to the present embodiment.

FIG. 2 is an exploded perspective view of a cell 21 constituting the fuel battery stack 20.

The cell 21 is constituted of an electrolyte membrane 22, an anode 23, a cathode 24, and separators 26 and 27. The anode 23 and the cathode 24 are diffusion electrodes which sandwich the electrolyte membrane 22 from both sides to form a sandwich structure. The separators 26 and 27 made of a gas-impermeable conductive material form passages of the fuel gas and the oxidizing gas between the anode 23 and the cathode 24 while further sandwiching this sandwich structure from both sides. In the separator 26, ribs 26a having concave cross sections are formed. The anode 23 abuts on the ribs 26a to close open portions of the ribs 26a, thereby forming the fuel gas passage. In the separator 27, ribs 27a having concave cross sections are formed. The cathode 24 abuts on the ribs 27a to close open portions of the ribs 27a, thereby forming the oxidizing gas passage.

The anode 23 contains, as a main component, carbon powder carrying a platinum-based metal catalyst (Pt, Pt—Fe, Pt—Cri, Pt—Ni, Pt—Ru or the like), and comprises a catalyst layer 23a which comes in contact with the electrolyte membrane 22, and a gas diffusion layer 23b formed on the surface of the catalyst layer 23a and having both air permeability and electron conductivity. Similarly, the cathode 24 comprises a catalyst layer 24a and a gas diffusion layer 24b. More specifically, as to the catalyst layers 23a and 24a, carbon powder carrying platinum or an alloy of platinum and another metal is dispersed in an appropriate organic solvent, and an appropriate amount of an electrolyte solution is added thereto, whereby the resultant pasted material is screen-printed on the electrolyte membrane 22. The gas diffusion layers 23b and 24b are made of a carbon cloth woven by use of a carbon fiber, carbon paper or carbon felt. The electrolyte membrane 22 is a proton conductive ion exchange membrane made of a solid polymer material such as a fluorine based resin, and exerts a satisfactory electric conductivity in a wet state. The electrolyte membrane 22, the anode 23 and the cathode 24 form a membrane electrode assembly 25.

Figure 3:
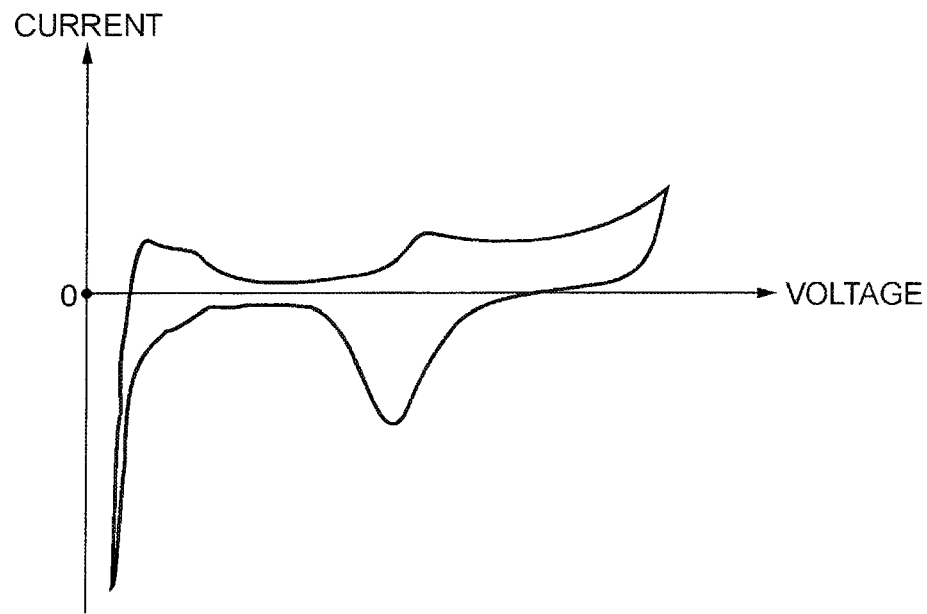
FIG. 3 is a C-V property diagram of a fuel battery stack according to the present embodiment.

FIG. 3 shows the C-V properties of the fuel battery stack 20.

The C-V properties indicate the dynamic electric properties of the fuel battery stack 20. When the voltage of the fuel battery stack 20 is raised at a constant speed, a current flows in a direction from the outside into the fuel battery stack 20 (a minus direction). When the voltage of the fuel battery stack is lowered at a constant speed, the current flows in a direction from the fuel battery stack 20 to the outside (a plus direction). It has been found that such dynamic electric properties are obtained by an electric double layer capacity component of a catalyst carrier of the fuel battery stack 20 and an apparent capacity component generated by an oxidization reducing reaction of the catalyst.

Figure 4:
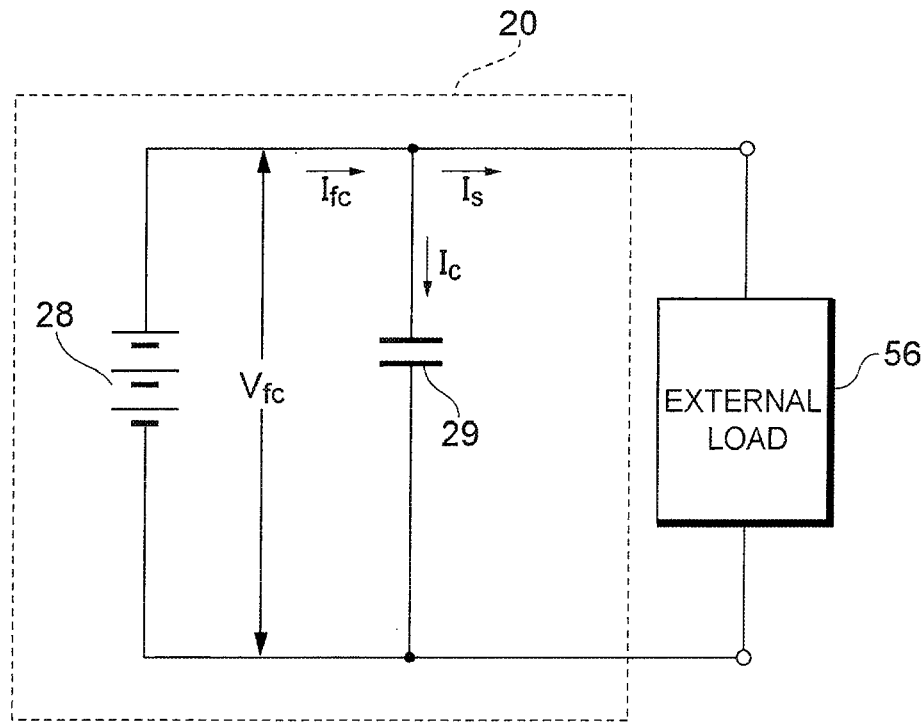
FIG. 4 is an equivalent circuit diagram of the fuel battery stack according to the present embodiment.

FIG. 4 is an equivalent circuit diagram in which the dynamic electric properties of the fuel battery stack 20 are modeled.

The fuel battery stack 20 has a circuit constitution in which an ideal fuel battery 28 and a capacitor 29 are connected in parallel. The ideal fuel battery 28 is obtained by modeling a virtual fuel battery which does not have the above C-V properties, and performs a behavior equivalent to that of a variable power source from a viewpoint of electric properties. The capacitor 29 is modeled by using the electric behavior of the electric double layer as a capacity element. An external load 56 is an equivalent circuit obtained by modeling the power system 50. Equations (4) and (5) are established as follows, in which Ifc is a current flowing out of the ideal fuel battery 28, Vfc is the output voltage of the ideal fuel battery 28 (the output voltage of the fuel battery stack 20), Ic is a current flowing into the capacitor 29, Is is a current flowing out of the fuel battery stack 20 to the external load 56, C is the capacity of the capacitor 29 and t is time.

$$Ifc = Ic + Is \quad (4)$$

$$Ic = C \cdot \Delta Vfc / \Delta t \quad (5)$$

As shown in the equations (4) and (5), when the output voltage Vfc lowers, the current Ic flowing into the capacitor 29 decreases in accordance with the variation $\Delta Vfc/\Delta t$ per unit time, whereby the current Is flowing out of the fuel battery stack 20 to the external load 56 increases. On the other hand, when the output voltage Vfc is raised, the current Ic flowing into the capacitor 29 increases in accordance with the variation $\Delta Vfc/\Delta t$ per unit time, whereby the current Is flowing out of the fuel battery stack 20 to the external load 56 decreases. However, in a case where a diode for preventing the counterflow of the current is interposed between the fuel battery stack 20 and the DC/DC converter 51, even if the output voltage Vfc is raised, the current does not flow in such a direction as to flow into the fuel battery stack 20.

Next, executing conditions and prohibiting conditions of high potential avoidance control will be described.

Examples of the executing conditions of the high potential avoidance control include (A1) the SOC of the battery 52 is a first threshold value (e.g., 70%) or less and (B1) the detection of gas leakage based on the piping pressure of the fuel gas supply system 30 (the detection value of the pressure sensor 74) is not being judged, and all the conditions are satisfied. On the other hand, examples of the prohibiting conditions of the high potential avoidance control include (A2) the SOC of the battery 52 is a second threshold value (e.g., 75%) or more and (B2) the detection of the gas leakage based on the piping pressure of the fuel gas supply system 30 is being judged, and one of the conditions is satisfied.

When the executing conditions of the high potential avoidance control are satisfied, the output voltage of the fuel battery stack 20 is limited to be not larger than a high potential avoidance voltage which is lower than the open end voltage thereof. The high potential avoidance voltage preferably satisfies a condition that the voltage is in such a voltage range that the platinum catalyst included in the catalyst layers 23a and 24a of the fuel battery stack 20 is not eluted. Furthermore, in addition to the condition, the voltage preferably satisfies a condition that in a case where the output voltage of the fuel battery stack 20 is kept at the high potential avoidance voltage while the supply of the reactant gas to the fuel battery stack 20 is stopped, the voltage is in such a range that the power generated by the fuel battery stack 20 can be consumed by the auxiliary machines 55. The high potential avoidance voltage is preferably treated as a variable control value which varies in accordance with the SOC of the battery 52, the power consumption of the auxiliary machines 55 or the like every second.

On the other hand, when the prohibiting conditions of the high potential avoidance control are satisfied, the output voltage of the fuel battery stack 20 is allowed to rise up to the open end voltage thereof.

It is to be noted that it has been described above that judgment conditions for switching on/off the high potential avoidance control function are set on the basis of the SOC of the battery 52, but the judgment conditions for switching on/off the high potential avoidance control function may be set on the basis of the chargeable amount of the battery 52. For example, when the chargeable amount of the battery 52 is less than a predetermined threshold value, the high potential avoidance control function is switched on. When the chargeable amount of the battery 52 is not less than the predetermined threshold value, the high potential avoidance control function may be switched off. Moreover, as the executing conditions of the high potential avoidance control, the above (A1) and (B1) may be changed to another condition, or a further condition may be added. As the prohibiting conditions of the high potential avoidance control, the above (A2) and (B2) may be changed to another condition, or a further condition may be added.

Figure 5:
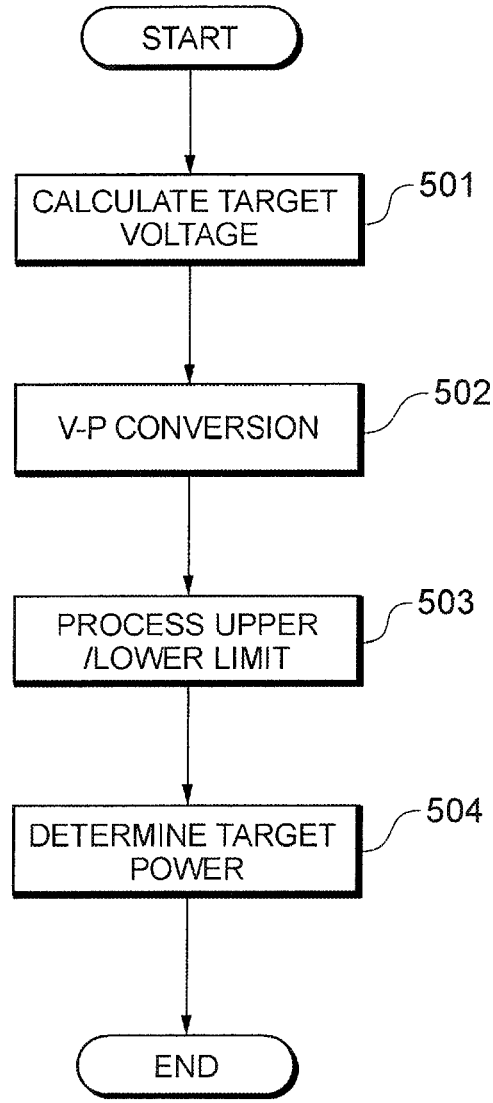
FIG. 5 is a flow chart showing a calculation method of a target power according to the present embodiment.

Next, a method for calculating the target power of the fuel battery stack 20 will be described with reference to FIG. 5.

First, the controller 60 calculates a high potential avoidance target voltage in accordance with the charge state of the battery 52, the power consumption of the auxiliary machines 55 and the like (step 501). For example, in a case where the charge amount of the battery 52 is small (or in a case where the chargeable amount is large), even when the high potential avoidance target voltage is set to a small voltage value, the battery sufficiently affords to store the generated power by the high potential avoidance control. Therefore, in such a case, the high potential avoidance target voltage is preferably set to a small value to suppress the deterioration of the fuel battery stack 20. On the contrary, in a case where the charge amount of the battery 52 is large (or in a case where the chargeable amount is small), the battery does not sufficiently afford to store the generated power by the high potential avoidance control. Therefore, in such a case, the high potential avoidance target voltage is preferably set to a large value to suppress the amount of the power to be generated by the high potential avoidance control.

Moreover, even in a case where the charge amount of the battery 52 is large (or in a case where the chargeable amount is small), when the power consumption of the auxiliary machines 55 is expected to be large, the high potential avoidance target voltage is preferably set to a small value to suppress the deterioration of the fuel battery stack 20.

Moreover, the high potential avoidance target voltage during regenerative braking may be changed in accordance with the running mode (D/B range) of the vehicle. Here, the D range is a running mode used during usual running, and the B range is a running mode used in a case where a large braking force is required as compared with the usual running, for example, in a case where the vehicle runs along a descending slope, over a hump or the like. During the regenerative braking by the traction motor 54, a motor regenerative torque is converted into a power to charge the battery 52. Therefore, when the high potential avoidance control is performed even during the regenerative braking, the balance of the power is established as follows.

$$\text{Battery charge power+auxiliary machine power consumption=motor regenerative power+power generated by fuel battery} \quad (6)$$

As shown in the equation (6), when the power generated by the fuel battery during the braking of the vehicle is large, the motor regenerative power accordingly decreases, and a sufficient braking torque cannot be acquired. Therefore, during the vehicle braking, the high potential avoidance target voltage is preferably increased, thereby decreasing the power generated by the fuel battery to acquire the sufficient braking torque. In consequence, the controller 60 can variably set the high potential avoidance target voltage so as to establish equation (7) during the vehicle braking as follows.

$$\text{Battery charge power+auxiliary machine power consumption} \geq \text{motor regenerative power+power generated by fuel battery} \quad (7)$$

Specifically, the controller 60 judges, based on a shift position, whether the running mode of the vehicle is in the D range or the B range. In a case where the running mode is in the B range, the target value of the high potential avoidance target voltage is increased as compared with a case where the running mode is in the D range, to acquire the large braking force. This can improve the drivability of the vehicle.

Next, the controller 60 converts the high potential avoidance target voltage determined in the step 501 into a target power value by use of the V-P conversion map 82 (step 502), and processes upper and lower limits (step 503). In the processing of the upper and lower limits, the controller 60 judges whether or not the high potential avoidance target voltage obtained in the step 502 is above the upper limit value and below the lower limit value.

When the target power value is above the upper limit value, the target power value is limited to the upper limit value. When the target power value is below the lower limit value, the target power value is limited to the lower limit value. Here, the upper limit value and the lower limit value are preferably set on the basis of the upper limit value and lower limit value of the power passing through the DC/DC converter 51, when the DC/DC converter 51 is in a predetermined drive mode (e.g., the single phase operation). The controller 60 determines the target power value obtained through the processing of the upper and lower limits as the final target power value (step 504), to control the battery operation.

According to the present embodiment, it is possible to effectively suppress the failure of the converter influenced by the control error of the passing power of the DC/DC converter 51 resulting from the erroneous estimation of the I-V property map 81 caused by the momentary drop of the target voltage during the high potential avoidance control.

The invention claimed is:

1. A fuel cell apparatus comprising:
    a fuel cell configured to receive supply of a reactant gas to generate a power;
    an estimation device configured to estimate output properties of the fuel cell;
    a battery into which the power generated by the fuel cell is charged;
    auxiliary machines configured to consume the power generated by the fuel cell;
    a high potential avoidance voltage setting device configured to set a high potential avoidance target voltage value to a small value, as the charge amount of the battery is small or as the power consumption of the auxiliary machines is large;
    a target power calculation device configured to convert the high potential avoidance target voltage value into a target power value on the basis of the output properties and to limit the target power value to a range between a predetermined upper limit value and a predetermined lower limit value;
    a control device programmed to control the operation of the fuel cell on the basis of the target power value while limiting the output voltage of the fuel cell to a value which is not larger than the high potential avoidance target voltage; and
    a voltage control device configured to control the output voltage of the fuel cell,
    wherein the upper limit value and the lower limit value are set on the basis an upper limit value and a lower limit value of a passing power which passes through the voltage control device.

2. The fuel cell apparatus according to claim 1, wherein the high potential avoidance voltage setting device is configured to variably set the high potential avoidance target voltage value for each predetermined calculation cycle.

3. The fuel cell apparatus according to claim 1, wherein the estimation device is configured to update the output properties for each predetermined calculation cycle.

4. The fuel cell apparatus according to claim 1, wherein the voltage control device is a DC/DC converter configured to switch between a single phase operation and a three-phase operation in accordance with the passing power.

5. The fuel battery system cell apparatus according to claim 1, wherein the high potential avoidance voltage setting device is configured to set the high potential avoidance target voltage value to a large value in a case where a motor regenerative power is charged into the battery as compared with a case where the motor regenerative power is not charged into the battery.

6. The fuel cell apparatus according to claim 1, wherein the high potential avoidance voltage setting device is configured to set the high potential avoidance target voltage value to a large value during running in a second running mode which requires a braking force larger than that of a first running mode.

* * * * *

UNITED STATES PATENT AND TRADEMARK OFFICE
CERTIFICATE OF CORRECTION

PATENT NO.        : 8,546,033 B2
APPLICATION NO.   : 12/808556
DATED             : October 1, 2013
INVENTOR(S)       : M. Yoshida Page 1 of 1

It is certified that error appears in the above-identified patent and that said Letters Patent is hereby corrected as shown below:

In the Claims:

At column 10, line 34, please correct "on the basis an upper limit" to read -- on the basis of an upper limit --.

Signed and Sealed this
Twenty-eighth Day of January, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,546,033 B2
APPLICATION NO. : 12/808556
DATED : October 1, 2013
INVENTOR(S) : Michio Yoshida Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 422 days.

Signed and Sealed this
Fifteenth Day of September, 2015

Michelle K. Lee
*Director of the United States Patent and Trademark Office*